United States Patent

Tysowski

(10) Patent No.: US 8,775,702 B2
(45) Date of Patent: *Jul. 8, 2014

(54) SYSTEM AND METHOD FOR RECOGNIZING A KEYSTROKE IN AN ELECTRONIC DEVICE

(75) Inventor: Piotr Tysowski, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,949

(22) Filed: Sep. 14, 2012

(65) Prior Publication Data

US 2013/0013826 A1    Jan. 10, 2013

Related U.S. Application Data

(63) Continuation of application No. 13/167,442, filed on Jun. 23, 2011, now Pat. No. 8,296,485, which is a continuation of application No. 12/506,376, filed on Jul. 21, 2009, now Pat. No. 7,991,929, which is a continuation of application No. 11/285,087, filed on Nov. 23, 2005, now Pat. No. 7,594,050.

(51) Int. Cl.
  *G06F 13/38*    (2006.01)
  *G06F 3/023*    (2006.01)

(52) U.S. Cl.
  CPC .................................. *G06F 3/0237* (2013.01)
  USPC ............................................. 710/67; 710/15

(58) Field of Classification Search
  USPC .......................................................... 710/67
  See application file for complete search history.

(56) References Cited

U.S. PATENT DOCUMENTS 5,151,873 A * 9/1992 Hirsh ............................ 708/172
5,424,730 A   6/1995 Sasaki et al.

(Continued)

FOREIGN PATENT DOCUMENTS

EP    1569079 A1    8/2005
WO    0038041 A1    6/2000

(Continued)

OTHER PUBLICATIONS

Communication, dated Mar. 30, 2010, mailed by European Patent Office, in counterpart European Patent Application No. 05111193.8 (6 pages).

(Continued)

*Primary Examiner* — Henry Tsai
*Assistant Examiner* — John Roche
(74) *Attorney, Agent, or Firm* — Finnegan, Henderson, Farabow, Garrett & Dunner LLP

(57) ABSTRACT

The disclosure provides a system and a method of processing keystrokes entered on an electronic device. The method comprises: monitoring for activation of two or more keys on the keyboard; evaluating whether the activation of those keys occurs within a set window of time; evaluating locations of those keys. After these evaluations, if the keystroke conflict is determined to not have been produced, then characters for those keys are generated in order of their activations. If the keystroke conflict is determined to have been produced, then the method arbitrates between those keys to select a key utilizing a dictionary to automatically determine the key to be selected. In the dictionary, its entries are related to each of those keys combined with any previously entered keystrokes. The method then processes the selected key to generate on a display one character, which is associated with the selected key.

18 Claims, 5 Drawing Sheets

(56) References Cited

U.S. PATENT DOCUMENTS

| | | | |
|---|---|---|---|
| 5,734,928 A * | 3/1998 | Nakasuji | 710/67 |
| 5,945,928 A | 8/1999 | Kushler et al. | |
| 6,230,222 B1 | 5/2001 | Rush | |
| 6,307,549 B1 * | 10/2001 | King et al. | 715/810 |
| 6,801,190 B1 * | 10/2004 | Robinson et al. | 345/173 |

FOREIGN PATENT DOCUMENTS

| | | | |
|---|---|---|---|
| WO | 0062150 A1 | 10/2000 | |
| WO | 0074240 A1 | 12/2000 | |

OTHER PUBLICATIONS

Extended European Search Report, dated Mar. 2, 2006, mailed by European Patent Office, in counterpart European Patent Application No. 05111193.8 (8 pages).

Summons to Attend Oral Proceedings, dated Mar. 16, 2012, mailed by European Patent Office, in European Patent Application No. 05111193.8 (5 pages).

Decision to Refuse a European Patent Application, dated Jun. 27, 2012, mailed by European Patent Office, in European Patent Application No. 05111193.8 (10 pages).

* cited by examiner

400

SYSTEM AND METHOD FOR RECOGNIZING A KEYSTROKE IN AN ELECTRONIC DEVICE

RELATED APPLICATION

This application is a continuation application of co-pending U.S. application Ser. No. 13/167,442, which is a continuation application of U.S. application Ser. No. 12/506,376, filed on Jul. 21, 2009, issued as U.S. Pat. No. 7,991,929 on Aug. 2, 2011, which is a continuation application of U.S. application Ser. No. 11/285,087, filed on Nov. 23, 2005, issued as U.S. Pat. No. 7,594,050 on Sep. 22, 2009, all of which are incorporated herein by reference.

FIELD OF THE DISCLOSURE

The disclosure described herein relates to a system and method for recognizing a keystroke entered on a keypad of an electronic device, such as a handheld communication device. In particular, the disclosure described herein relates to identifying and resolving keystroke entries when potentially conflicting keystrokes are entered on a device.

BACKGROUND OF THE DISCLOSURE

Mobile telephonic devices (MTD) such as cell phones and phone-enabled Personal Digital Assistants (PDAs) are connected to a wireless network where one or more such devices communicate using voice or data to each other or to external services. Services can include making external phone calls to land-line voice networks, making phone calls to other cell phones, leaving or retrieving voice mail messages or exchanging data messages, such as e-mails, text messages, pages and others. Such devices send and receive a variety of communications in a variety of formats. Such devices can also track appointments and store electronic notes. All of the communications, appointments and notes are logged within the device. Text is entered into the device by a user through a keypad.

There is a tendency for such devices to provide more features and larger displays in smaller form factors. As such, available real estate shrinks for other needed elements, such as the keypad or a keyboard. With smaller keypads, the keys are also made smaller and are spaced closer together. As such, the potential increases for mis-striking a key and activating two adjacent keys during an intended keystroke.

There is a need to address deficiencies in the prior art.

BRIEF DESCRIPTION OF THE DRAWINGS

The disclosure will now be described, by way of example only, with reference to the accompanying drawings, in which.

DETAILED DESCRIPTION OF AN EMBODIMENT

Figure 1:
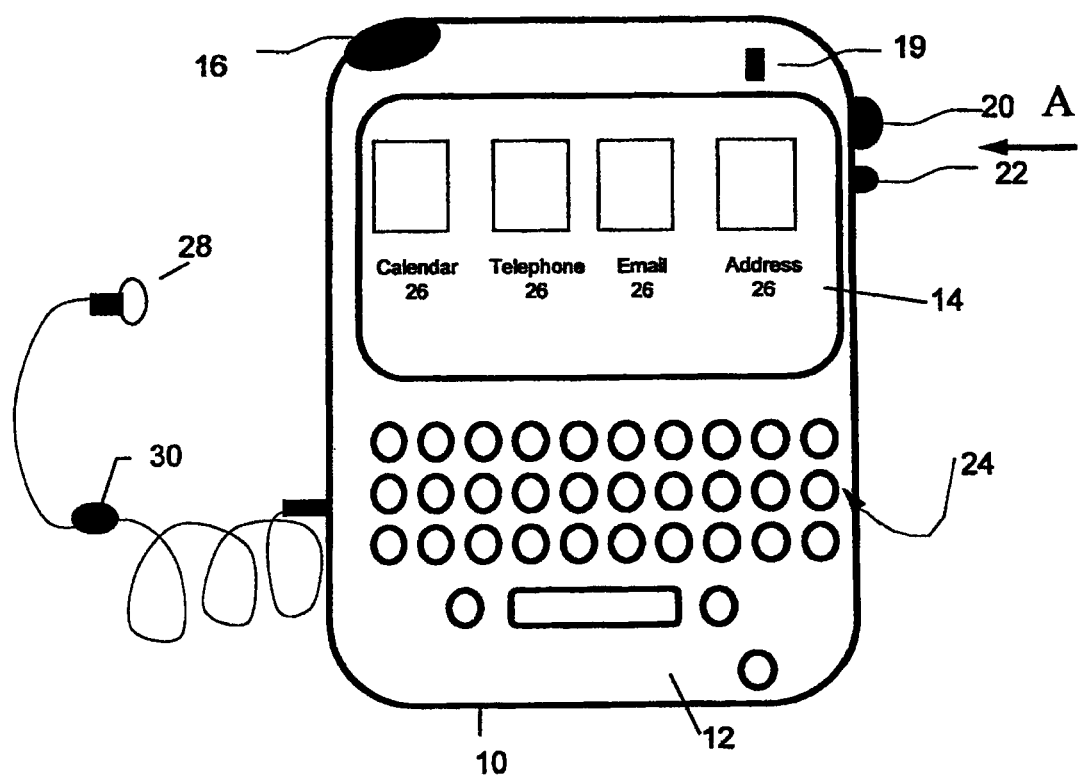
FIG. 1 is a schematic representation of an electronic device having a keypad and a keystroke arbitrator in accordance with an embodiment.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect of an embodiment, a method of processing keystrokes on a keyboard being entered on an electronic device is provided. The method comprises: monitoring for activation of two or more keys on the keyboard; evaluating whether the activation of those keys occurs within a set window of time as a factor in determining whether a keystroke conflict exists with those keys; evaluating locations of those keys as another factor to determine if a keystroke conflict exists. In evaluating the factors, if the keystroke conflict is determined to not have been produced then the method generates on the display characters for those keys in order of their activation. If the keystroke conflict is determined to have been produced, then the method arbitrates between those keys to select a key by utilizing entries in a dictionary to automatically determine the key to be selected. In the dictionary, the entries are related to each of those keys combined with any previously entered keystrokes. The method then processes the selected key to generate on a display of the electronic device one character only, which is associated with the selected key. Further the method does not process the key(s) not selected.

In the method, if activation of the keys represent a chord keystroke, then the method may generate a key represented by the chord keystroke and may consider that the activation is not a keystroke conflict.

In the method, identifying the selected key may comprise: for each key of the keys, building an alternative word using previously entered keystrokes; selecting a likely word from all alternative words built using the those keys; and selecting the selected key utilizing the likely word.

In the method, in the identifying the selected key, selecting the likely word may comprise: examining records in a dictionary for any matching records for the all alternative words, each record of the records comprising a word segments and selection data; and selecting the likely word from the all alternative words after analyzing the any matching records. Therein, if the any matching records comprises two or more matching records, the method may assess selection data in the matching records to select the likely word from the alternative words.

In the method, after the generating the one character, if generation of the one character is corrected, then the method may search for an entry in the dictionary entries containing a word comprising the previously entered keystrokes and the different character, and if an entry is found, the method may update selection data associated with the entry to reflect the correction.

In the method, after generating one character, if the character is corrected, then the method may change the likely word to another word from the alternative words.

In the method, the selection data may comprise a ranking score.

In the method, the selection data may comprise a frequency score.

The method may further comprise updating the records with revised selection data determined from usage data derived from text entered into the device.

In the method, identifying the selected key may comprise comparing activation characteristics of the keys to identify the selected key.

In the method, activation characteristics may comprise activation pressures of the keys.

In the method, identifying the selected key may comprise: identifying a highest ranking key of the keys by evaluating rankings of the keys; and selecting the highest ranking key as the selected key.

In the method, the keys may be in a keypad having a reduced number of keys; and the method may further comprise disambiguating values for each of the keys prior to identifying a selected key from the keys.

In a second aspect, an electronic device is provided. The device comprises: a keypad; a display; a microprocessor; a keystroke activation module for detecting when two or more keys on the keypad are activated; and an arbitrator for determining whether a keystroke conflict exists when two or more keys have been activated within a set window of time. In the device, the arbitrator evaluates locations of the keys on the keyboard as a factor to determine if the keystroke conflict exists, and if the keystroke conflict does not exist, then it generates those keys on the display in order of their activation. If the evaluator determines that the keystroke conflict does exist, the evaluator resolves the keystroke conflict by arbitrating between the two or more keys to select a key from the keys by utilizing entries in a dictionary to automatically determine the key to be selected. Next the arbitrator processes the selected key to generate on a display of the electronic device one character only, the one character being associated with the selected key; and does not process the key or keys not automatically selected. In the dictionary, the entries are related to the keys combined with any previously entered keystrokes.

In the device, the arbitrator may further determine if the activation of the keys represent a chord keystroke and may generate a key represented by the chord keystroke as the keystroke conflict is determined to have not been produced.

The device may further comprise: a dictionary containing records of word segments and associated selection data; and a word building module that builds alternative words using each of the keys and previously entered keys. The arbitrator may evaluate the alternative words against entries in records in the dictionary to identify a likely word comprising the selected key.

In the device, after a character is generated, if generation of the character is corrected, then the device may search for an entry in the dictionary for a word comprising the previously entered keystrokes and the different character, and if an entry is found, the device may update a record associated with the likely word.

In the device, the dictionary may be periodically updated with new word segments and associated selection data for the records.

In the device, the keys may be in a keypad having a reduced number of keys; and the arbitrator may disambiguate values for each of the keys prior to identifying the selected key from the keys.

In another aspect, a method of processing keystrokes being entered in an electronic device is provided. The method comprises: monitoring for activation of two or more keys on the device; determining whether activation of the keys produces a keystroke conflict; and if a conflict exists, then executing further steps. The further steps include: identifying a selected key from the activated keys; and from those keys, generating only one character relating to the selected key.

In the method, the step of identifying the selected key may comprise: for each activated key, building an alternative word using previously entered keystrokes; selecting a likely word from all alternative words built using the activated keys; and selecting the selected key utilizing the likely word.

In the method, in the step of identifying the selected key, the step of selecting the likely word may comprise: examining records in a dictionary for any matching records for all alternative words, where each record comprises a word segment and selection data; and selecting the likely word from all alternative words after analyzing the matching records. If there are two or more matching records, then the selection data of the matching records are assessed to select the likely word.

In the method, further steps may be taken after generating the character associated with the selected key. In particular, if the generation of the character is corrected by the user, then the selection data associated with that likely word in the dictionary may be updated. Further, if the generation of the character is corrected by the user, then the likely word may be changed to another word from the alternative words.

In the method, the selection data may comprise a ranking score for all alternative words having records in the dictionary. Alternatively, the selection data may comprise a frequency score for all alternative words having records in the dictionary.

In the method, the step of identifying the selected key may comprise comparing activation characteristics of the activated keys to identify the selected key. Further, the activation characteristics may comprise times of activation of the activated keys. Alternatively, the activation characteristics may comprise activation pressures of the activated keys.

In the method, the step of identifying the selected key may comprise: identifying a highest ranking key of the activated keys by evaluating rankings associated with the keys; and selecting said highest ranking key as said selected key.

The method may further comprise the step of updating the records with revised selection data determined from usage data derived from text previously entered into the device.

In the method, a criterion for the keystroke conflict may be the elapsed time between activation of the keys.

The method may be used on a keypad having a reduced number of keys. Also, the method may further comprise disambiguating values for the keys prior to identifying a selected key from the keys.

In yet another aspect, an electronic device is provided. The device comprises: a keypad; a display; a microprocessor; a keystroke activation module; and a keystroke arbitrator. The activation module monitors the keypad for activation of two or more keys on the keypad. The arbitrator determines whether a keystroke conflict exists among the key activations. If so, it identifies a selected key from the activated keys and initiates generation of one character only on the display, where the character is associated with the selected key.

The device may further comprise: a dictionary containing records of word segments and associated selection data; and a word building module that builds alternative words using each of the activated keys and previously entered keys. The keystroke arbitrator evaluates the alternative words against entries in the records in the dictionary to identify a likely word comprising the selected key.

The device may update selection data of a record associated with the likely word if the character is corrected by the user.

In the device, the dictionary may be periodically updated with new word segments and associated selection data.

In the device, the arbitrator may utilize activation times of the keystrokes to determine whether a keystroke conflict exists.

In the device, the keys may be in a keypad having a reduced number of keys. Also, the arbitrator may disambiguate values for each key prior to identifying the selected key from the keys.

In other aspects various combinations of sets and subsets of the above aspects are provided.

Referring to FIG. 1, an electronic device for receiving electronic communications, in accordance with an embodiment of the disclosure is indicated generally at 10. In the present embodiment, electronic device 10 is based on a computing platform having functionality of an enhanced personal digital assistant with cellphone and e-mail features. It is, however, to be understood that electronic device 10 can be based on construction, design and functions of other electronic devices, such as smart telephones, desktop computers pagers or laptops having telephony equipment. In a present embodiment, electronic device 10 includes, a housing 12, which frames an LCD display 14, a speaker 16, an LED indicator 19, a trackwheel 20, an exit key 22, keypad 24 and a telephone headset comprised of an ear bud 28 and a microphone 30. Trackwheel 20 and exit key 22 can be inwardly depressed along the path of arrow "A" as a means to provide additional user-input.

Various applications are provided on device 10, including email, telephone, calendar and address book applications. A GUI to activate these applications is provided on display 14 through a series of icons 26. Shown are calendar icon 26, telephone icon 26, email icon 26 and address book icon 26. Such applications can be selected and activated using the keypad 24 and/or the trackwheel 20. Further detail on selected applications is provided below.

It will be understood that housing 12 can be made from any suitable material as will occur to those of skill in the art. Device 10 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and many forms of 802.11 wireless broadband, like 802.11a, 802.11b, 802.11g, etc. that can support voice. Other embodiments include Voice over IP (VoIP) type streaming data communications that can simulate circuit switched phone calls. Ear bud 28 can be used to listen to phone calls and other sound messages and microphone 30 can be used to speak into and input sound messages to device 10.

Figure 2:
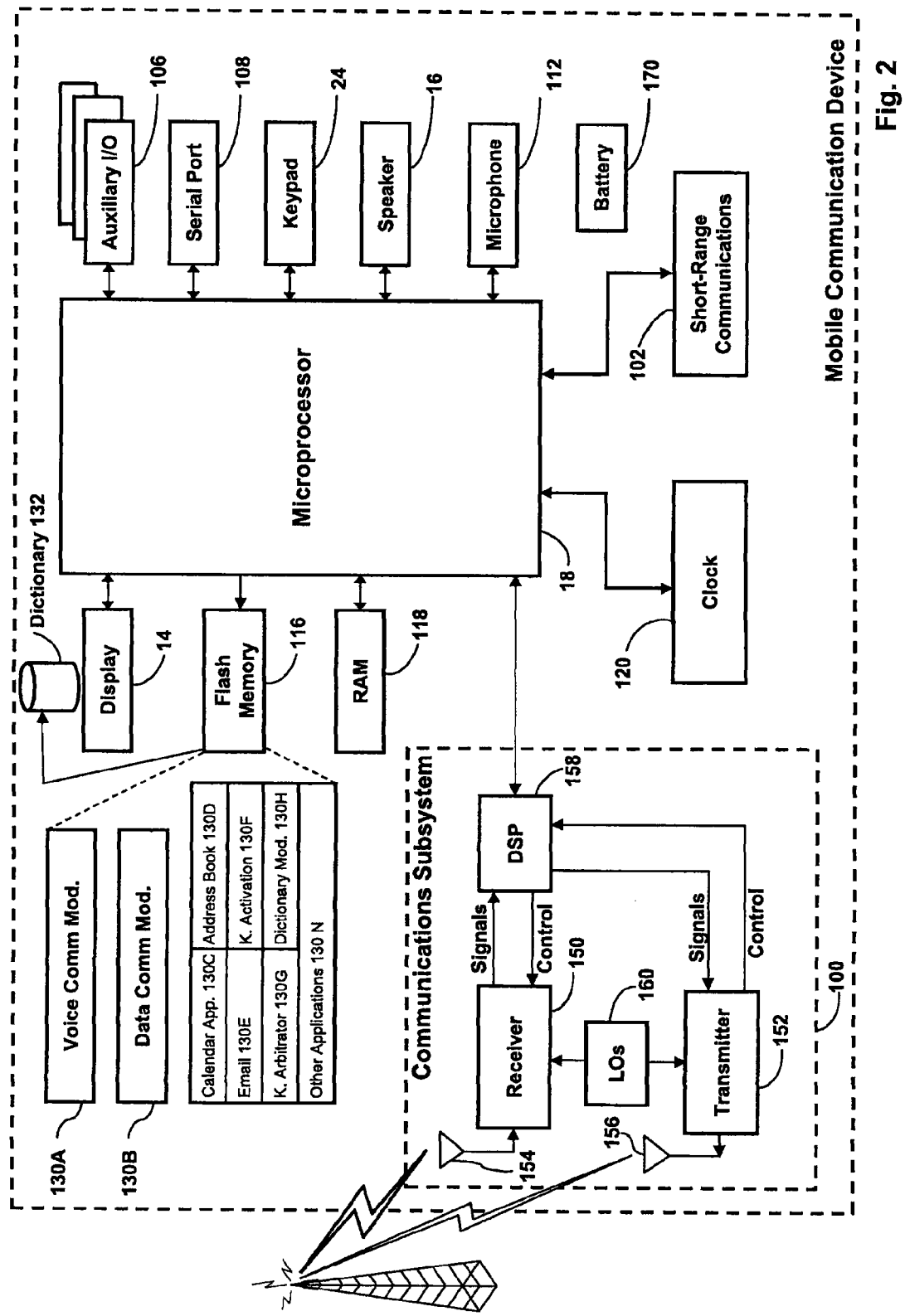
FIG. 2 is a block diagram of certain internal components within the device of FIG. 1.

Referring to FIG. 2, functional elements of device 10 are provided. The functional elements are generally electronic or electro-mechanical devices. In particular, microprocessor 18 is provided to control and receive almost all data, transmissions, inputs and outputs related to device 10. Microprocessor 18 is shown schematically as coupled to keypad 24, display 14 and other internal devices. Microprocessor 18 controls the operation of the display 14, as well as the overall operation of the device 10, in response to actuation of keys on the keypad 24 by a user. Exemplary microprocessors for microprocessor 18 include Data 950 (trade-mark) series microprocessors and the 6200 series microprocessors, all available from Intel Corporation.

In addition to the microprocessor 18, other internal devices of the device 10 include: a communication subsystem 100; a short-range communication subsystem 102; keypad 24; and display 14; with other input/output devices including a set of auxiliary I/O devices 106, a serial port 108, a speaker 110 and a microphone port 112 for microphone 30; as well as memory devices including a flash memory 116 (which provides persistent storage of data) and random access memory (RAM) 118; clock 120 and other device subsystems (not shown). The device 10 is preferably a two-way radio frequency (RF) communication device having voice and data communication capabilities. In addition, device 10 preferably has the capability to communicate with other computer systems via the Internet.

Operating system software executed by microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications 130 that control basic device operations, such as a voice communication module 130A and a data communication module 130B, may be installed on the device 10 during manufacture or downloaded thereafter.

Communication functions, including data and voice communications, are performed through the communication subsystem 100 and the short-range communication subsystem 102. Collectively, subsystem 102 and subsystem 100 provide the signal-level interface for all communication technologies processed by device 10. Various other applications 130 provide the operational controls to further process and log the communications. Communication subsystem 100 includes receiver 150, transmitter 152 and one or more antennas, illustrated as receive antenna 154 and transmit antenna 156. In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communication Service (PCS), Global System Communication (GSM), etc. Communication subsystem 100 provides device 10 with the capability of communicating with other devices using various communication technologies, including instant messaging (IM) systems, text messaging (TM) systems and short message service (SMS) systems.

In addition to processing communication signals, DSP 158 provides control of receiver 150 and transmitter 152. For example, gains applied to communication signals in receiver 150 and transmitter 152 may be adaptively controlled through automatic gain control algorithms implemented in DSP 158.

In a data communication mode, a received signal, such as a text message or web page download, is processed by the communication subsystem 100 and is provided as an input to microprocessor 18. The received signal is then further processed by microprocessor 18 which can then generate an output to the display 14 or to an auxiliary I/O device 106. A user may also compose data items, such as e-mail messages, using keypad 24, a thumbwheel associated with keypad 24, and/or some other auxiliary I/O device 106, such as a touchpad, a rocker switch, a separate thumbwheel or some other input device. The composed data items may then be transmitted over communication network 140 via communication subsystem 100.

In a voice communication mode, overall operation of device 10 is substantially similar to the data communication mode, except that received signals are output to speaker 110, and signals for transmission are generated by microphone 30. Alternative voice or audio I/O subsystems, such as a voice message recording subsystem, may also be implemented on device 10.

Short-range communication subsystem 102 enables communication between device 10 and other proximate systems or devices, which need not necessarily be similar devices. For example, the short-range communication subsystem may include an infrared device and associated circuits and components, or a Bluetooth™ communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack. A power switch (not shown) providing an "on/off" switch for device 10. Upon activation of the power switch an application 130 is initiated to turn on device 10. Upon deactivation of the power switch, an application 130 is initiated to turn off device 10. Power to device 10 may also be controlled by other devices and by internal software applications.

Additional applications include calendar 130C which tracks appointments and other status matters relating to the user and device 10. Calendar 130C is activated by activation of calendar icon 26 on display 14 (FIG. 1). It provides a daily/weekly/month electronic schedule of appointments, meetings and events entered by the user. Calendar 130C tracks time and day data for device 10 using processor 18 and internal clock 120. The schedule contains data relating to the current accessibility of the user. For example it can indicate when the user is busy, not busy, available or not available. In use, calendar 130C generates input screens on device 10 prompting the user to input scheduled events through keypad 24. Alternatively, notification for scheduled events could be received via an encoded signal in a received communication, such as an e-mail, SMS message or voicemail message. Once the data relating to the event is entered, calendar 130C stores processes information relating to the event; generates data relating to the event; and stores the data in memory in device 10.

Address book 130D enables device 10 to store contact information for persons and organizations. Address book 130D is activated by activation of address book icon 26 on display 14 (FIG. 1). In particular, name, address, telephone numbers, e-mail addresses, cellphone numbers and other contact information is stored. The data can be entered through keypad 24 and is stored in non-volatile memory, such as persistent storage 116 in device 10 in a database.

Email application 130E provides modules to allow user of device 10 to generate email messages on device 10 and send them to their addressees. Application 130E also provides a GUI which provides a historical list of emails received, drafted, saved and sent. Text for emails can be entered through keypad 24. Email application 130E is activated by activation of email icon 26 on display 14 (FIG. 1).

Key activation module 130F is a module stored and operating on device 10 that recognizes activation of a key on keypad 24. It may be implemented in software or firmware. For example, it may be provided by a BIOS routine installed in device 10. Keystroke activation module 130F is connected to the outputs of keypad 24 and is able to read its signals. Generally, activation module 130F operates continuously in the background of device 10.

Turning now to additional notable features of an embodiment, device 10 has components and applications allowing it to determine: when a user is entering alphanumeric characters via the keypad on device 10; whether a keystroke conflict has occurred (e.g. if two or more keystrokes are entered simultaneously or nearly simultaneously); what alternative words can be built from the conflicting keystrokes; and how to resolve the conflict. Generally, a keystroke conflict occurs as the user is entering text and mistakenly activates at least two keys at the about the same time. Further, the conflict occurs more likely when the two keys are physically adjacent to each other. Consider an example, where the user intends to enter the word "KITS" on device 10 and he has already entered the text "KIT". For the last key, as he activates the "S" key, he mistakenly also activates its neighbouring "A" key at about the same time. The embodiment resolves the conflict between the "S" key and the "A" key. In one embodiment, the conflict is resolved by building alternative words using the conflicting characters (e.g. "KITS" and "KITA"), reviewing the alternative words against a dictionary to determine that the "A" key is likely not the intended character. As such, device 10 processes the "S" keystroke and generates an "S" character in the application 130 currently in operation on device 10. This typically includes causing an "S" character to be displayed on display 14. Also for the embodiment, device 10 does not process the "A" keystroke. This example is used again below to illustrate other aspects of the embodiment.

The embodiment may also generate a visual or an oral indication of the mis-typing on device 10. For example, device 10 may emit a soft "beep" or display 14 may provide a "flash" signal thereon when two keys are activated simultaneously or almost simultaneously.

For the above noted feature, an important aspect for the embodiment is to determine when a key in keypad 24 is being activated. Activation of a key generally follows a keystroke depress and release cycle of a switch: a key is initially in a rest (un-activated) position, then it is activated by the user by the user pressing down on the key until an activation point is passed, then it is held down for a length of time, and finally, it is released and returns to its rest position. The technology of the keypad determines how a key is activated and what signals are generated. A typical electro-mechanical keypad has a switch which is normally "open" and is depressed to a "closed" position, which then completes an electrical circuit and generates an electrical signal. When the key is released, it returns to its rest position and the circuit become "open" again. For example, when the "a" key is pressed, keypad 24 generates a signal indicating activation of the "a" key and when the "a" key is released, keypad 24 generates another signal indicating the release of key. The signals can be analog or digital signals. Conditions and states of analog signals may be determined from the level of the signal or a transition of the signal from one level to another. The analog signal may also be a pulse signal. All signals are provided to activation module 130F for further processing.

It will be appreciated that keystrokes can be compound keystrokes. For example, if the "a" key is activated simultaneously with the "shift" key, indicating a capital "A", each key generates an activation signal. When each key is released, it generates another signal. Again, the set of signals received by activation module 130F is used to recognize that the capital "A" keystroke had been activated and released. The actual parameter which identifies when a key is activated (e.g. on the downstroke, on the upstroke or after being held down for a specific amount of time) may be set by the embodiment.

Keypad technologies may use pressure sensing devices, strain gauges, touch screens, elastomer panels with carbon pucks, electrical switches and other technologies to identify when a key is being activated. Depending on the implementation, a key can be recognized as being activated on the completion of its downstroke (i.e. when it is initially being activated) or the completion of its upstroke (i.e. after the key had been activated and then subsequently has been released). Most applications utilize the downstroke of a key to represent its activation; however, the upstroke may also used. Other signals, such as the time of activation and pressure data for the key may also be provided. The time data allows time windows to be set for defining simultaneous activations of keys. The pressure data may be used to identify relative forces being used to activate different keys. If a first key is activated with a certain amount of force, and a second key is activated with a second, lesser amount of force then, the difference in forces may be indicate which key was intended to be activated.

The embodiment can process different types of keystrokes that are recognized as valid keystrokes. Exemplary types of keystrokes include: basic, chord, state, time-sensitive, multiple activation and sequence. Each is described in turn.

A basic keystroke is a single activation of a single key, e.g. "a", "b", "c", etc. A chord keystroke is the activation of two or more keystrokes together to indicate a specialized character, e.g. activation of a "shift" key with the "a" key to indicate "A". A state keystroke produces different characters depending on the toggle state of an associated "state" key. For example, if the "caps lock" key is toggled to be "on", then subsequent alphabetic characters are generated in uppercase until the "caps lock" is de-activated. In other embodiments, the "caps lock" key may be automatically toggled after the entry of the next keystroke. The state key also may be used for "symbol" keys and special character keys. A time-sensitive keystroke changes the value of a generated key depending on how long the keystroke is activated. For example, if the "a" key is depressed and held down after a set period of time, the value of the key may be changed to "A". A multiple activation keystroke changes the value of a key when it is activated multiple times in quick succession (within a time limit). For example, multiple activation keystrokes are found on devices using the telephonic numeric keypad. A character is generated by sequentially activating a key a different number of times. For example, the "2" key has the characters "a", "b" and "c" associated with it. To generate one of those characters, a user successively activates the "2" key, once, twice or three times in quick succession. For a sequence keystroke, a special character is generated when a predetermined sequence of keystrokes is entered. In particular, an initial value of a keystroke may be generated upon the activation of a key; however, when a subsequent keystroke is activated, depending on the value of the subsequent keystroke, the value of the initial key may then be updated. A device may use sequence keystrokes to facilitate entry of special characters. For example, if an email address is being entered into a device, a special sequence may be defined for entering the "@" symbol for an email address. To generate the "@" symbol, a predefined sequence keystroke may be defined where a user must first enter a "space" key and then an alphanumeric key. When the "space" key is activated, the device generates a "space" character, as would normally be done. However, if the user, next enters an alphanumeric character, then the device automatically replaces the previous "space" character with an "@" character and also generates the alphanumeric character. If a non-alphanumeric character is entered, then no change is made to the previous "space" character and the non-alphanumeric character is generated It will be appreciated that other types of keystroke may be defined.

Also, in other embodiments, a keypad having a reduced number of keys may be provided. In such a keypad, keys may have two or more characters associated with them. Instead of using multiple activations to generate a character for a key, the user may activate the key once. If there is ambiguity in identifying which character should be generated for the key, software operating on the device analyses the alternatives for the key against previously entered keystrokes to disambiguate the selected value for the key. Next, the embodiment can use the selected value of that key and the value of the conflicting key to predict the intended input for the keystroke. Dictionaries may be used to build alternate words using the previously entered keystrokes and the ambiguous keystroke to attempt to disambiguate the keystroke. Use of a dictionary to resolve conflicting keystrokes can then also be used, as described in further detail later.

As noted above, the embodiment can preferably process all of the above noted types of keystrokes. Conflicting keystrokes may occur in different manifestations, depending on what type or types of keystrokes are being processed.

Figure 4:
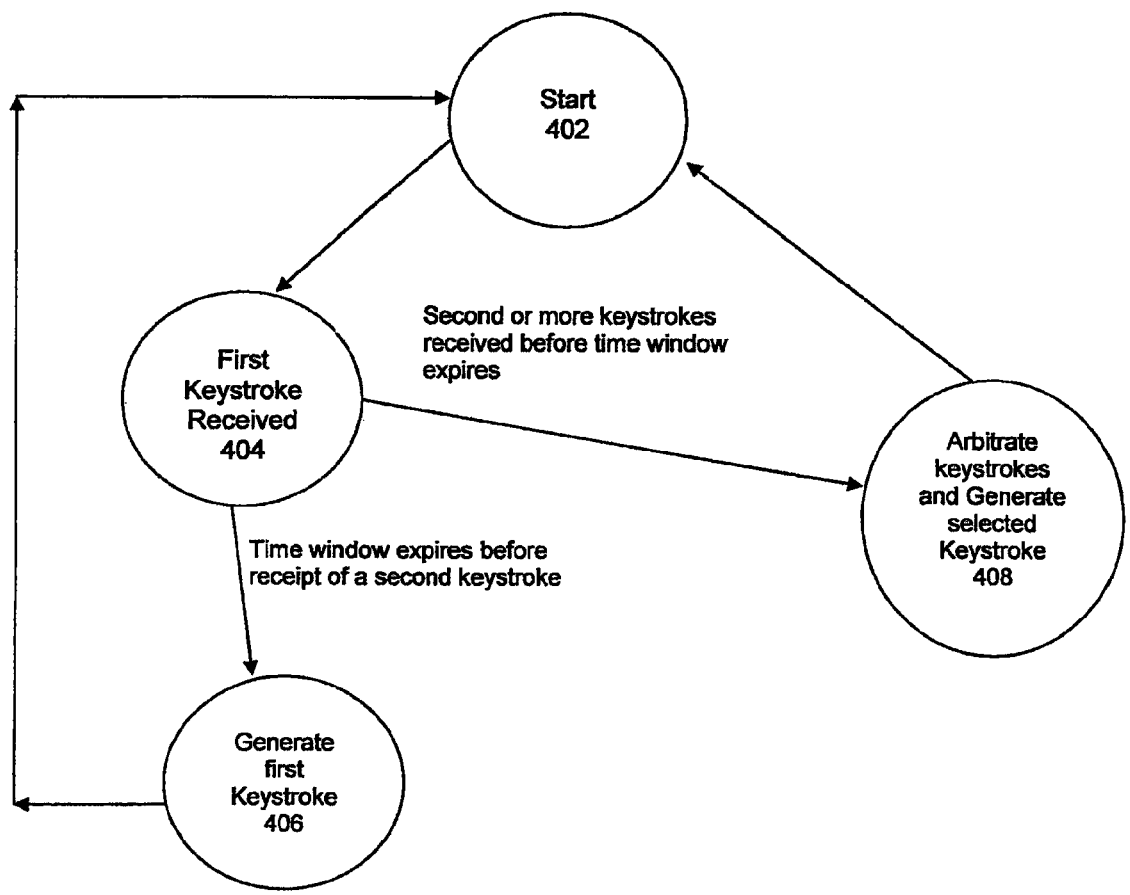
FIG. 4 is state diagram of basic states entered as the keystroke arbitrator of FIG. 1 which evaluates and arbitrates keystrokes.

A basic algorithm followed by an embodiment is shown in FIG. 4 through state diagram 400. At state 402, the device starts and waits for a keystroke. At state 404, a first keystroke is received. The receipt of the first keystroke starts a time window. Then, whether the time window expires or whether one or more subsequent keystrokes are received within the time window determines the next state of the embodiment. If no subsequent keystroke is received within the time window, then the character associated with the first keystroke is generated in state 406 and the state returns to state 402. If one or more subsequent keystrokes are received within the time window, then the keystrokes must be arbitrated. As such, the embodiment moves to arbitration state 408. In arbitration state 408, two or more keystrokes are arbitrated and one keystroke is selected as the keystroke to be generated. The selection of the keystroke may utilize any of the algorithms described herein. Arbitration may occur among two or more keystrokes. Further, when arbitrating the keystrokes, it may be necessary to determine which type of keystroke has just been entered (e.g. chord, sequential, state, single, multiple, etc. as described above). Once a keystroke is selected, it is generated and the embodiment returns to state 402. Additionally, if any correction is made by the user to the selection made by the embodiment, the correction is entered and the dictionary is updated, if necessary. Transitions between states in state diagram 400 are executed collectively by keystroke activation module 130F, arbitrator 130G, dictionary module 130H and dictionary 132. The specific tasks may be conducted by any module or the tasks may be shared.

It will further be appreciated that in another embodiment, individual keystrokes are recognized and processed as they are received. Conflicts may be detected after two or more keystrokes have been processed and generated. Upon subsequent detection of a conflict, the resulting selection of a keystroke may be used to replace a previously processed and generated keystroke with the selected keystroke.

There are at least two criteria which are evaluated to determine whether a keystroke conflict has occurred. One criterion is whether the two keystrokes are physically adjacent to each other. In a standard, QWERTY keyboard, if a user types a "d" and an "1" in quick succession, this may not represent a keystroke conflict. However, if the user types a "d" and an "s" in quick succession, this may represent a conflict. Another criterion is the length of time between keystrokes. If the user types a "d" followed by an "s" after a certain window of time, this may not represent a conflict. However, if those two keys are activated within that period of time, a conflict is produced. It will be appreciated that the above noted window of time may be any length of time, but typically, the size of the window would be a fraction of a second, e.g. 0.9, 0.8, 0.5, 0.2, 0.1, or 0.05 seconds. The size of the window may depend on the time resolution provided by elements in device 10, including microprocessor 18 and its associated clocking rate. It will be appreciated that an embodiment can set parameters as to what constitutes a keystroke conflict using either criterion, a combination of the criteria or additional criteria.

Details are now provided on how keystroke conflicts are detected and resolved. First, some detail is provided on general mechanics of word processing by device 10. When alphanumeric text is being entered into device 10 by the user through keypad 24, it is entered serially, character by character, through input of a user as the user types individual characters on keypad 24. Following grammar conventions, the text typically represents a series of "words" separated by opening and closing delimiters. Each "word" may be a collection of alphabetic characters, numeric digits, alphanumeric characters, or alphanumeric and special characters. For example, a word may be "dog", "CAT", "M5K1E6", "555-1212", "−$123.45", "PassWord12345". The characters may be part of an ASCII character set and other specially defined characters. A delimiter may comprise a white space character, a punctuation mark character (e.g. . , ; ! - etc.), a "return" character, multiple consecutive delimiters and for any other characters designed by the embodiment. In some contexts, a delimiter may be considered to be part of a word (e.g. in a telephone number, the word "555-1212" may represent one word, with the delimiter "-" therein).

As a word is being entered and as each character is being entered on keypad 24, each character is generated and displayed on display 14. However, keystroke arbitrator 130G tracks and builds each "word" as it is being entered. For example, consider the text string:

"Today's meeting about kits is at 12:30 PM; and use the password ERCAS34#22"
which is being entered into the body of an email in application 130E.

The parsed words in the text string
Today's
meeting
about
kits
is
at
12:30 PM
and
use
the
password
ERCAS34#22

The embodiment stores in a buffer, such as in memory RAM 118, new words as they are being entered. The buffer also may or may not also keep previously generated words. A parsing algorithm processes the entered characters and recognizes relevant delimiters. For example, when the embodiment recognizes that a delimiter has been entered, when the first non-delimiter character is subsequently entered, it will consider that a new word is being entered. As such, for the word "kits", when the "space" character preceding the "k" is entered, the embodiment has award building module that recognizes that a new word is being entered and builds the new word as each successive character is entered until a closing delimiter is entered. As such, the new word builds from "k" to "ki" to "kits". It will be appreciated that parsing and word building algorithms may be provided as a separate application or as part of another application in device 10. When the conflicting keystrokes are detected (which may be done by arbitrator 130G), the word building module (which may be provided in arbitrator 130G) builds two (or more) alternative words using each conflicting keystroke (e.g. "kits" and "kita"), then arbitrator 130G builds a message providing text strings of all alternatives and sends it to dictionary query and maintenance module 130H (herein generally referred to as dictionary module 130H). Alternatively, the words may be provided in separate messages. It will then wait for a response message from dictionary module 130H to determine a next step.

Dictionary module 130H is an application which preferably operates in the background in device 10. Based on requests in messages received from arbitrator 130G, it generates database queries to check the correctness of the spelling of alternative words. The alternative words may be composed of alphabetic characters, alphanumeric characters or alphanumeric and special characters. The queries are provided to dictionary 132 for its entries. Query processing may be implemented using known query systems, such as an SQL engine. Based on the results provided from the queries, the SQL engine provides arbitrator 130G with the results of the queries in one or more responding messages. The results indicate whether there are or are not entries in the dictionary 132 for any alternative words and selection data (including any frequency counts and rankings) associated with any matching entries. Dictionary module 130H also selectively provides data updates and new entries to dictionary 132. These updates and new entries may be provided through appropriate query commands, such as the "add" and "modify" SQL commands. These commands may be built and asserted through a database insertion/modification module in dictionary module 130H.

Dictionary 132 is the database which is accessed by the queries generated by dictionary module 130H. It contains a list of words, alphanumeric text and associated selection data (such as frequency counts) which provides additional selection information to arbitrator 130G. Dictionary 132 may also store alphanumeric strings such as postal codes, numeric strings such as telephone numbers and other alphanumeric phrases which may be entered as words into device 10.

When arbitrator 130G receives the response message(s) from dictionary module 130H, it analyses the results to select an appropriate word from the alternative words and then processes the associated selected keystroke between the two conflicting keystrokes and ignores the keystroke not selected. If more than two conflicting keystrokes are identified, then the arbitrator can process each keystroke or select a subset of keystrokes to process. Further, if a keystroke can have multiple possible values (e.g. a key can be either one of n different assignments depending on the current context of words or text being entered), then one or more of the possible values can be processed.

A user accessible configuration application 130 provides a GUI on device 10 displayed on display 14 which allows the user to set certain operating parameters of activation module 130F. Any configuration data provided through the GUI is provided by configuration application 130 to activation module 130F which can then update its operating parameters accordingly. One parameter may selectively disable the keystroke conflict resolution feature entirely. Another parameter may set the size of the time window which marks two keystrokes as being activated simultaneously or nearly simultaneously. Another parameter may set how the keystroke conflict resolution feature makes a selection. For example, arbitrator 130G may utilize data provided from dictionary module 130H, timing data, other activation data for the keystroke provided by activation module 130F or any combination such data. For example, a keystroke may be selected by determining which keystroke was activated first, was activated the longest, had the greater activation pressure applied or a combination of these parameters. It will be appreciated that a combination of any of the parameters may be used in parallel or in stages, to select a keystroke for activation.

Figure 3:
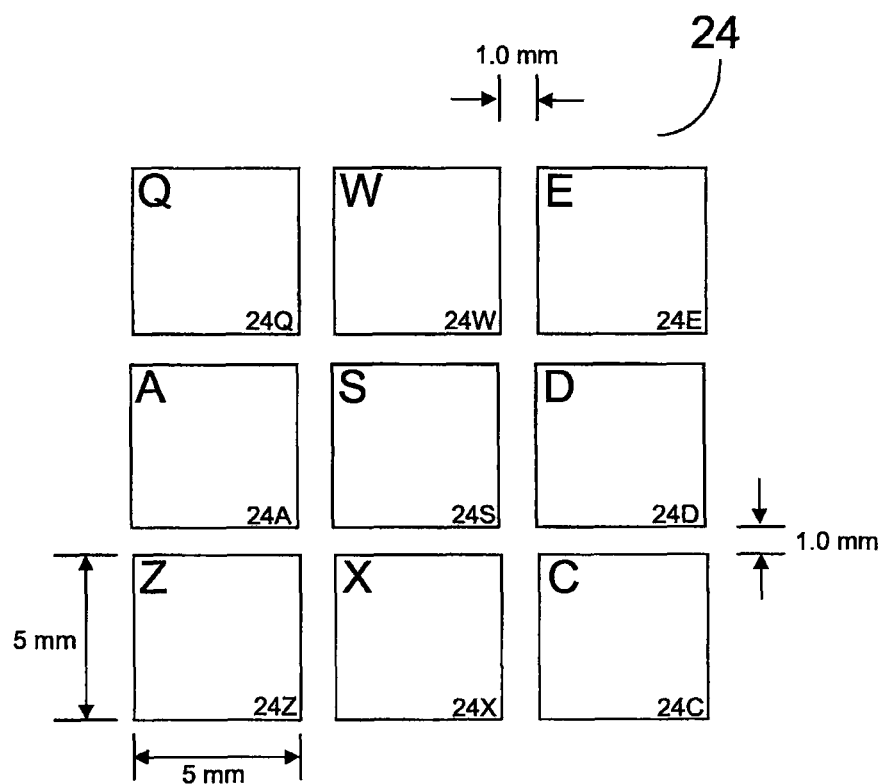
FIG. 3 is a schematic representation of a keypad which is used in an embodiment of FIG. 1.

Further, detail on keystroke conflict resolution implemented by an embodiment is provided through an example of a word being entered on keypad 24 on device 10. In FIG. 3, a section of keypad 24 is shown with representative keys 24Q, 24W, 24E, 24A, 24S, 24D, 24Z, 24X, and 24C, showing a cover of keys laid out in the known "QWERTY" style layout. For convenience, suffixes for keys 24 shown in FIG. 3 utilize the label of the corresponding key. As such, the "Q" key is identified as key 24Q.

Keys 24 are laid out in a fairly close arrangement. As shown, "S" key 24S is surrounded by keys 24Q, 24W, 24E, 24A, 24D, 24Z, 24X and 24C. Different keypad layouts may have different spacing arrangements. The spacing between keys 24 is shown to be 1 mm. In other embodiments, it may be less or more. The physical size of keys 24 is approximately 5 mm×5 mm. Other dimensions for keys may be used in other arrangements. With such a close arrangement, it will be appreciated that when a user is entering text through keys 24, it is very easy to activate two keys simultaneously or nearly simultaneously when only one key was meant to be activated. This is especially true if a user types with his thumbs or if he types quickly.

The ongoing example is used to illustrate execution of an algorithm after it is determined that a keystroke conflict has occurred. For the example, it is presumed that the user has already entered the string "kit" and is about to press the "s" key, when he/she inadvertently almost simultaneously also presses the "a" key. For the word "kits" in the above-noted text string, keystroke activation module 130F will first identify that the word "kit" is being built when it receives two conflicting, simultaneous or nearly simultaneous signals from keys 24S and 24A. As such, activation module 130F will build two alternatives for the current word, namely "kits" and "kita". Arbitrator 130G provides these two word alternatives to dictionary module 130H. Then dictionary module 130H accesses dictionary 132 to identify allowable entries and their relative frequencies of occurrence.

Table A provides a representative portion of contents of dictionary 132.

TABLE A

| Word | Selection Data (Frequency/Ranking) |
|---|---|
| KIT | 2352/9 |
| KITA | 12/1 |
| KITCHEN | 123/8 |
| KITE | 185/9 |
| KITS | 2563/9 |
| KITSCH | 50/7 |

Data in dictionary 12 may be stored as text strings and numeric data, as appropriate. The data may be stored in any data structure which allows searching on a field of words then identifying any associated selection data (such as frequency and rankings) for any entry. As such, a table data structure, a hash table, a linked list of records or arty other suitable data structure may be used. The data structure would also allow insertion, modification and deletion of records. It is noted that dictionary 132 may recognize common beginning portions of words to reduce the number of entries that it tracks. For example, it is noted that Table A contains an entry for "kit", "kits" and "kitsch". As both "kit" and "kits" are contained within "kitsch", as an alternative, dictionary 132 may include only the entry for "kitsch". When an alternative word is compared against the contents of dictionary 132, if it matches, character for character, at least a portion of an entry in dictionary 132 from the entry's beginning, then the word can be considered to be correct. The selection data for each entry can be initialized depending on each entry's frequency of occurrence in common language or some other paradigm. Alternatively, the selection data may be set to be the same at first but be modified later according to the user's preference (via any corrections made).

Dictionary module 130H generates queries to examine dictionary 132 for words which begin with either "KITA" and "KITS". In the embodiment, dictionary 132 contains only characters in uppercase and all comparisons of alternative words are not case sensitive. In other embodiments, the case of a character may distinguish entries in dictionary 132. The answers to the queries return the records for "KITA" and "KITS", with their associated frequencies and/or rankings. These results are provided in a message to arbitrator 130G.

In arbitrator 130G, as it receives an indication that the alternative words are words in dictionary 132, it must determine the more likely candidate using selection data, such as the frequency and ranking information, for all alternatives. As the frequency for "kita" is lower than the frequency for "kits", then arbitrator 130G selects "kits" as the likely alternative word. If the dictionary did not have an entry for one alternative, then the other alternative having an entry would be selected. If neither alternative is in dictionary 132, then the embodiment may select either alternative depending on other parameters. For example, it may select the alternative which had the key which was activated first. In the above example, it would select the word "kits" if the "s" key was activated first.

After selecting the alternative word "kits", arbitrator 130G will select the "s" key to be entered and will ignore the keystroke for the "a" key. As such the word being built will be "kits" and the "s" character is generated and processed by device 10. Additional keystrokes would be processed and parsed as if no simultaneous activation had occurred.

However, if selection of the word "kits" key was incorrect, then it is expected that the user will correct the keystroke selection. The correction may be performed by activating a correction key on keypad 24, such as the delete or backspace key. The arbitrator 130G will monitor the next keystroke activated immediately a selection between alternative words was implemented. If the next keystroke is a correction key, then in addition to processing the correction activity (e.g. deletion of the last character), this information can also be used to update entries in dictionary 132. Continuing with the current example, after the embodiment selects the alternative word "kits", when the user presses the "backspace" key, the "s" character is deleted from the word. However, this also indicates that the "kits" selection was incorrect. As such, the probabilities for entries for "kits" and "kita" may be adjusted accordingly. As a further step, arbitrator 130G may then insert the "a" key to build the word "kita". If there are more than one alternatives, then arbitrator 130G may provide the user with a list of choices for the word.

As a further correction step, the frequency and ranking data for each alternative word may be adjusted. Arbitrator 130G may send a signal to dictionary module 130H to adjust the frequencies of the two entries. Therein, dictionary module 130H may use any algorithm to adjust the frequencies. For example, the frequency or ranking "kita" may be raised by an incremental amount and ranking of "kits" may be decreased by a decremental amount. If there is historic appearance data of either words then actual relative statistical probabilities may be generated and adjusted accordingly. In other embodiments, the selection data may indicate a generalized scale used to provide a gross ranking of entries. For example, for a ranking scale from 0 to 9 a higher ranking score would indicate a higher confidence that the word can be used. The rankings may also be adjusted accordingly. If an upward adjustment is made to the ranking for "kits", the ranking of "kita" may be decreased by one or more levels.

It will be appreciated that variations on adjustments made to frequencies and rankings can be provided. For example, changes may be made to one or both entries. Also, an "appearance count" may be kept as part of the selection data for each word which is incremented after every query provided to dictionary 132 causes a "hit" for that entry. Thereafter the appearance counts of each alternative word may be compared to identify a more likely candidate.

In another ranking scheme, each character is assigned a ranking level. This may be done according to their statistical frequency of use having regard to a particular language, a particular context of use, or past usage on the device. When there is a simultaneous or nearly simultaneous activation of two or more keys, then the ranking level of each key is identified and the key having the highest ranking score is selected as the more likely key. In this scheme, it may not be necessary to evaluate what word is currently being built. The rankings for the characters may provide a unique rank for each character or characters may share ranking levels. This ranking information may be kept in dictionary 132 against a record for each individual character.

In yet another ranking scheme, possible key pairs are identified (e.g. "A"+"S", "S"+"W", "G"+"H", etc.) and for each pair, a ranking value is assigned to each key such that one key in the pair is ranked higher than the other pair. For example, if the user presses "A" and "S" at the same time, then an entry for the pair "A"+"S" is added to a lookup table with a higher ranking provided for "A" based on some criteria (for instance, because it was pressed a little earlier than "S"). Thereafter, if "A"+"S" are activated at about the same time, the "A" is chosen. Subsequently, if the user corrects the keystroke, then the ranking for "S" is increased to become the preferred choice. If the user later presses A and Z at the same time then this pair is defined pair independently of the "A"+"S" pair, with their own rankings for each key. As a further scheme, required associations between keys are stored and noted. For example, in English the "Q" character is invariably followed by a "U". If a keystroke conflict is detected for the character immediately following a "Q" character, then the conflict may be resolved by automatically choosing a "U" character.

In the embodiment, the dictionary may be periodically updated with new entries and revised probabilities and rankings. The new entries, revised rankings and probabilities may be determined from usage data derived from text entered into the device.

Figure 5:
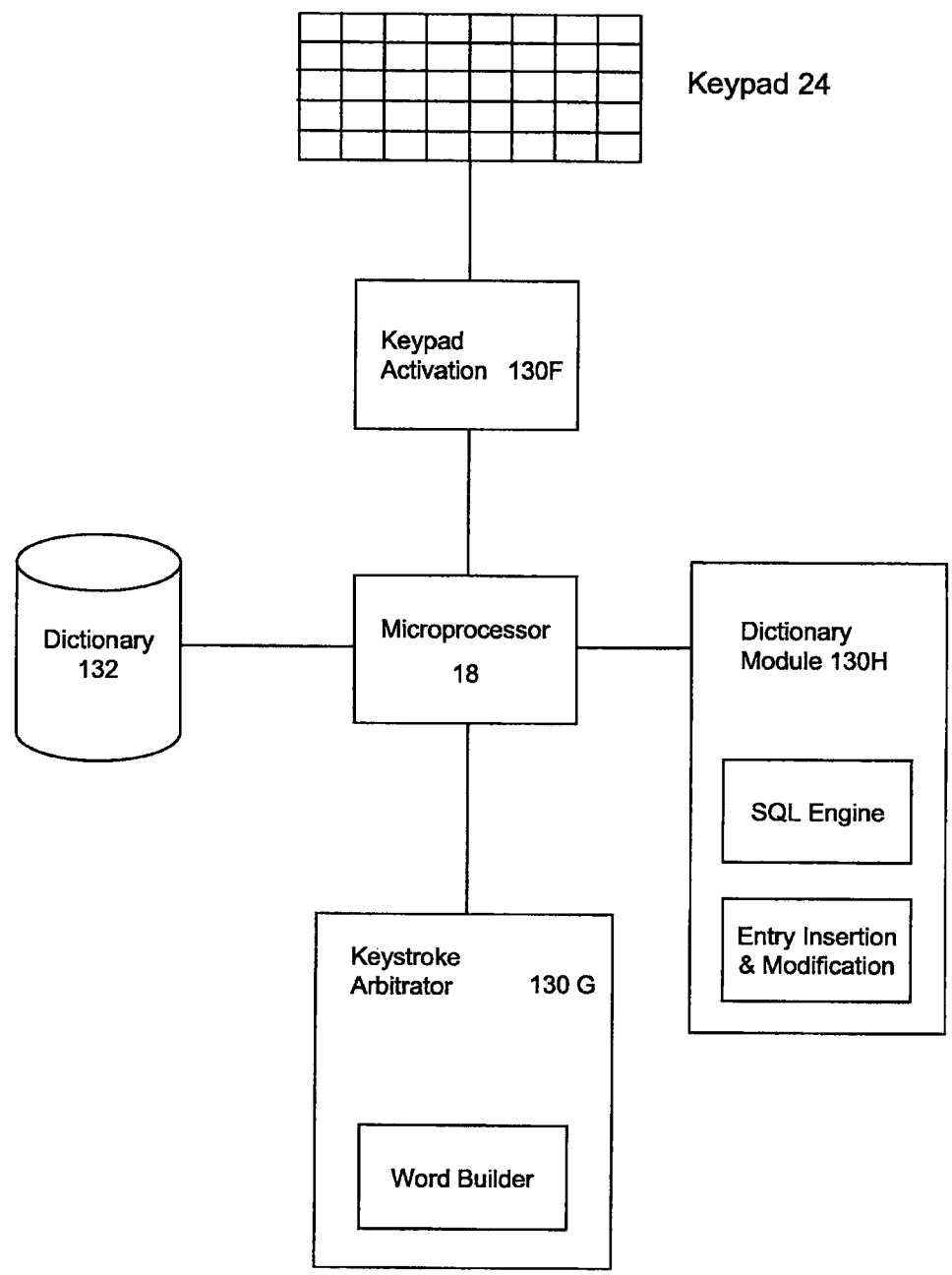
FIG. 5 is a block diagram showing relationships among the keypad, the keystroke arbitrator, a dictionary module, a dictionary in a database and internal components of an embodiment of FIGS. 1 and 2.

Specific relationships in an embodiment are shown in FIG. 5 where microprocessor 18 controls operation, access and updates to elements of keypad activation module 130F, arbitrator 130G, dictionary module 130H and dictionary 132.

As noted earlier, when a key 24 is activated the physical and electrical connections generate a signal which are recognized by keypad activation module 130F. Keypad activation module 130F identifies the key and provides this information to microprocessor 18 in an appropriate signal. Such keystroke signal is received by dictionary module 130H and arbitrator 130G. In dictionary module 130H. As such, if a word is being entered which is not in the dictionary, then dictionary module 130H can recognize this fact. The word may be automatically or selectively added to dictionary 132. Preferably the contents of dictionary 132 are stored in a permanent memory location such as flash memory 116.

As keystrokes are entered, arbitrator 130G evaluates parameters relating to the keystrokes to determine whether a keystroke conflict has occurred. For example, if two or more keys are activated more or less simultaneously, arbitrator 130G receives each signal for each key, evaluates the timing parameters for the keys and determines that a conflict has occurred. Arbitrator 130G then builds alternative words using the conflicting keys and provides it to dictionary module 130H.

Dictionary module 130H then generates queries to dictionary 132 for all alternative words. The results are provided to arbitrator 130G. If there are entries for all alternatives, then arbitrator 130G examines the probabilities and/or rankings of the alternatives. If both entries have identical probabilities, then arbitrator 130G uses another indicator to select the key. For example, it may select the first key activated or the key held down the longest. Such information is provided by keystroke activation module 130F.

Once a keystroke is selected, arbitrator 130G accepts the identified key, and the character associated with the key is generated and displayed on display 14 in the running application. The selected key is processed as if it was the only key activated and the signal for the conflicting key is ignored. Thereafter, a new keystroke can be accepted and processed by device 10.

Once the keystrokes are identified, if any corrections are made, then dictionary 132 may be updated and its probabilities/rankings may be adjusted accordingly. If subsequent corrections are made, then further corrective updates may be made to dictionary 132.

It will be appreciated that the keystroke activation module 130F, the arbitrator 130G, the dictionary module 130H and other applications in the embodiments can be implemented using known programming techniques, languages and algorithms. The titles of the modules are provided as a convenience to provide labels and assign functions to certain modules. It is not required that each module perform only its functions as described above. As such, specific functionalities for each application may be moved between applications or separated into different applications. Different signaling techniques may be used to communicate information between applications using known programming techniques. Known data storage, access and update algorithms allow data to be shared between applications.

It will be appreciated that recognizing a conflict for keystroke can depend on particular values of the keystrokes and the types of keystrokes being processed. Some special analysis situations are described below.

As noted earlier, keystrokes which occur simultaneously may be processed as separate, legitimate keystrokes. This may occur if the two keystrokes involve two keys which are not adjacent to each other. However, in other circumstances, geographic proximity of keys (i.e. keys being adjacent to each other) may not be a significant criterion when determining if a conflict exists between two keystrokes.

Also, a chord keystroke may first appear to represent a conflict, when it actually does not. For example, if the left "shift" key is activated almost simultaneously with the "z" key, then this generally should not represent a conflict. To handle these situations, dictionary 132 may have a database of keystroke exceptions which is accessed by arbitrator 130G to identify non-conflict keystroke sequences.

Also, when one or more keys have different values associated with them (such as in devices having a reduced number of keys), then one step in determining whether a conflict has occurred involves executing a disambiguation analysis on each possible value of the keystrokes. Once the keystroke is disambiguated, a keystroke conflict analysis (as described above) may then be conducted.

In yet another embodiment, when a conflict is detected, the embodiment may take a more basic approach to determining the selected keystroke. For example, it may simply choose the first keystroke received. Alternatively, it may select the keystroke having the higher frequency of use, with little or no regard for the word currently being built. This feature has benefits when a conflict occurs during a keystroke sequence where less information or less robust predictability is available for selecting the more appropriate keystroke. This may occur if the conflict appears when the first character of a word is being entered.

Although the embodiment is described as being related to a portable communication device, it will be appreciated that other embodiments are provided which may not be portable. As long as there is an input device with the potential for having nearly simultaneously or simultaneously activated triggers, features of the embodiments described herein can be applied to resolving any conflicts among input signals received by the input device.

The present disclosure is defined by the claims appended hereto, with the foregoing description being merely illustrative of a preferred embodiment of the disclosure. Those of ordinary skill may envisage certain modifications to the foregoing embodiments which, although not explicitly discussed herein, do not depart from the scope of the disclosure, as defined by the appended claims.

The invention claimed is:

1. A method of processing key selections on a keypad being entered on an electronic device having a display, the method comprising:
    detecting a key selection conflict comprising selection of two or more keys located in proximity on the keypad;
    generating two or more words, each of the two or more words comprising a character associated with the keys of the key selection conflict;
    analyzing the two or more words to select a key from the keys of the key selection conflict based on rankings assigned to the two or more words;
    processing the selected key to generate one character only on the display, the one character being associated with the selected key;
    adjusting at least one of the rankings when correction of the selected key is detected; and
    applying, when correction of the selected key is detected, subsequent corrective updates to a dictionary database.

2. The method of claim 1, wherein detecting a key selection conflict comprises:
    detecting a selection of the two or more keys within a predetermined time.

3. The method of claim 1, wherein analyzing the two or more words to select a key comprises:
    generating text strings using the two or more words; and
    sending the text strings to the dictionary database.

4. The method of claim 1, wherein analyzing the two or more words to select a key comprises:
    determining whether each of the two or more words has a correct spelling; and
    if only one word is determined to have a correct spelling, assigning a higher ranking to the one word having a correct spelling.

5. The method of claim 1, wherein the rankings are assigned to the two or more words according to statistical frequency of use, context of use, or past usage on the electronic device.

6. The method of claim 1, wherein the rankings are assigned to the two or more words according to one or more likely words in a database.

7. The method of claim 1, wherein selecting a key based on the rankings assigned to the two or more words comprises:
    selecting a key associated with one of the two or more words with the highest ranking.

8. The method of claim 1, further comprising:
    adjusting at least one of the rankings based on the selected key.

9. An electronic device comprising:
    a display; and
    a processor configured to:
        detect a key selection conflict comprising selection of two or more keys located in proximity;
        generate two or more words, each of the two or more words comprising a character associated with the keys of the key selection conflict;
        analyze the two or more words to select a key from the keys of the key selection conflict based on rankings assigned to the two or more words;
        process the selected key to generate one character only on the display, the one character being associated with the selected key;
        adjust at least one of the rankings when correction of the selected key is detected; and
        applying, when correction of the selected key is detected, subsequent corrective updates to a dictionary database.

10. The electronic device of claim 9, wherein the processor is configured to detect a key selection conflict by:
    detecting a selection of the two or more keys within a predetermined time.

11. The electronic device of claim 9, wherein the processor is configured to analyze the two or more words to select a key by:
    generating text strings using the two or more words; and
    sending the text strings to the dictionary database.

12. The electronic device of claim 9, wherein the processor is configured to analyze the two or more words to select a key by:
    determining whether each of the two or more words has a correct spelling; and
    if only one word is determined to have a correct spelling, assigning a higher ranking to the one word having a correct spelling.

13. The electronic device of claim 9, wherein the rankings are assigned to the two or more words according to statistical frequency of use, context of use, or past usage on the electronic device.

14. The electronic device of claim 9, wherein the rankings are assigned to the two or more words according to one or more likely words in a database.

15. The electronic device of claim 9, wherein the processor is configured to select a key based on the rankings assigned to the two or more words by:

selecting a key associated with one of the two or more words with the highest ranking.

16. The electronic device of claim 9, wherein the processor is further configured to:

adjust the rankings based on the selected key.

17. The method of claim 1, further comprising:

generating a visual or an oral indication of the key selection conflict.

18. The electronic device of claim 9, wherein the processor is configured to generate a visual or an oral indication of the key selection conflict.

\* \* \* \* \*